(12) United States Patent
Luff (10) Patent No.: US 8,902,346 B2
(45) Date of Patent: Dec. 2, 2014

(54) SYSTEMS AND METHODS FOR CONTROLLING SCANNING MIRRORS FOR A DISPLAY DEVICE

(71) Applicant: Intersil Americas LLC, Milpitas, CA (US)

(72) Inventor: Gwilym Luff, Cambridge (GB)

(73) Assignee: Intersil Americas LLC, Milpitas, CA (US)

( * ) Notice: Subject to any disclaimer, the term of this patent is extended or adjusted under 35 U.S.C. 154(b) by 128 days.

(21) Appl. No.: 13/763,455

(22) Filed: Feb. 8, 2013

(65) Prior Publication Data

US 2014/0111703 A1   Apr. 24, 2014

Related U.S. Application Data

(60) Provisional application No. 61/717,500, filed on Oct. 23, 2012, provisional application No. 61/719,858, filed on Oct. 29, 2012.

(51) Int. Cl.
*H04N 5/222* (2006.01)
*H04N 5/74* (2006.01)
*G02B 26/10* (2006.01)

(52) U.S. Cl.
CPC ............ *H04N 5/7416* (2013.01); *G02B 26/101* (2013.01)

USPC .............. 348/333.1; 348/333.06; 348/333.08; 455/557

(58) Field of Classification Search
CPC ...................................... H04W 88/02
USPC .............. 455/557; 348/333.1, 333.06, 333.08
See application file for complete search history.

(56) References Cited

U.S. PATENT DOCUMENTS 7,982,793 B2 * 7/2011 Wills ......................... 348/333.1

* cited by examiner

*Primary Examiner* — Amancio Gonzalez
(74) *Attorney, Agent, or Firm* — Vierra Magen Marcus LLP (57) ABSTRACT

Certain embodiments described herein relate to a scanning controller configured produce a horizontal (H) and vertical (V) scanning control signal that is used to control a bi-axial scanning mirror of a scanning laser projector device, a system including such a scanning controller, and a method for generating such an H and V scanning control signal. In an embodiment, the H and V scanning control signal includes H scanning frequency content that is used to control a H scanning frequency of the bi-axial scanning mirror, and V scanning frequency content that is used to control a V scanning frequency of the bi-axial scanning mirror. To avoid cross talk, the scanning controller is configured to produce the H and V scanning control signal such that the H scanning frequency content has a null at DC, and the V scanning frequency content has a null at the H scanning frequency.

20 Claims, 7 Drawing Sheets

FIG. 7

SYSTEMS AND METHODS FOR CONTROLLING SCANNING MIRRORS FOR A DISPLAY DEVICE

PRIORITY CLAIM

This application claims priority under 35 U.S.C. 119(e) to U.S. Provisional Patent Application No. 61/717,500, filed Oct. 23, 2012, and U.S. Provisional Patent Application No. 61/719,858, filed Oct. 29, 2012, each of which is incorporated herein by reference.

BACKGROUND

Miniature scanning projector devices can be integrated with or attached various types of devices, such as mobile phones, computers, media players and automotive heads up displays. Such scanning projector devices display images by producing light beams and using one or more scanning mirrors to raster-scan reflected light onto a surface. The scanning mirror(s) are controlled using a horizontal (H) scanning control signal and a vertical (V) scanning control signal, where the H scanning frequency has a much higher frequency than the relatively slower V scanning frequency. For example, the H scanning frequency can be about 22.5 KHz, whereas the V scanning frequency can be about 60 Hz. These systems suffer from crosstalk between the H and V scanning control signals, which has been shown to adversely affect the horizontal and vertical scanning control of the scanning mirror(s), which adversely affects the resulting image.

DETAILED DESCRIPTION

As mentioned above, in a scanning projector device, the H scanning frequency is much higher than the relatively slower V scanning frequency. As also mentioned above, there can be crosstalk between the H and V scanning control signals, which has been shown to adversely affect the horizontal and vertical scanning control of the scanning mirror(s), which adversely affects the resulting image. Certain embodiments of the present invention, described below, reduce and preferably avoid such crosstalk.

Figure 1:
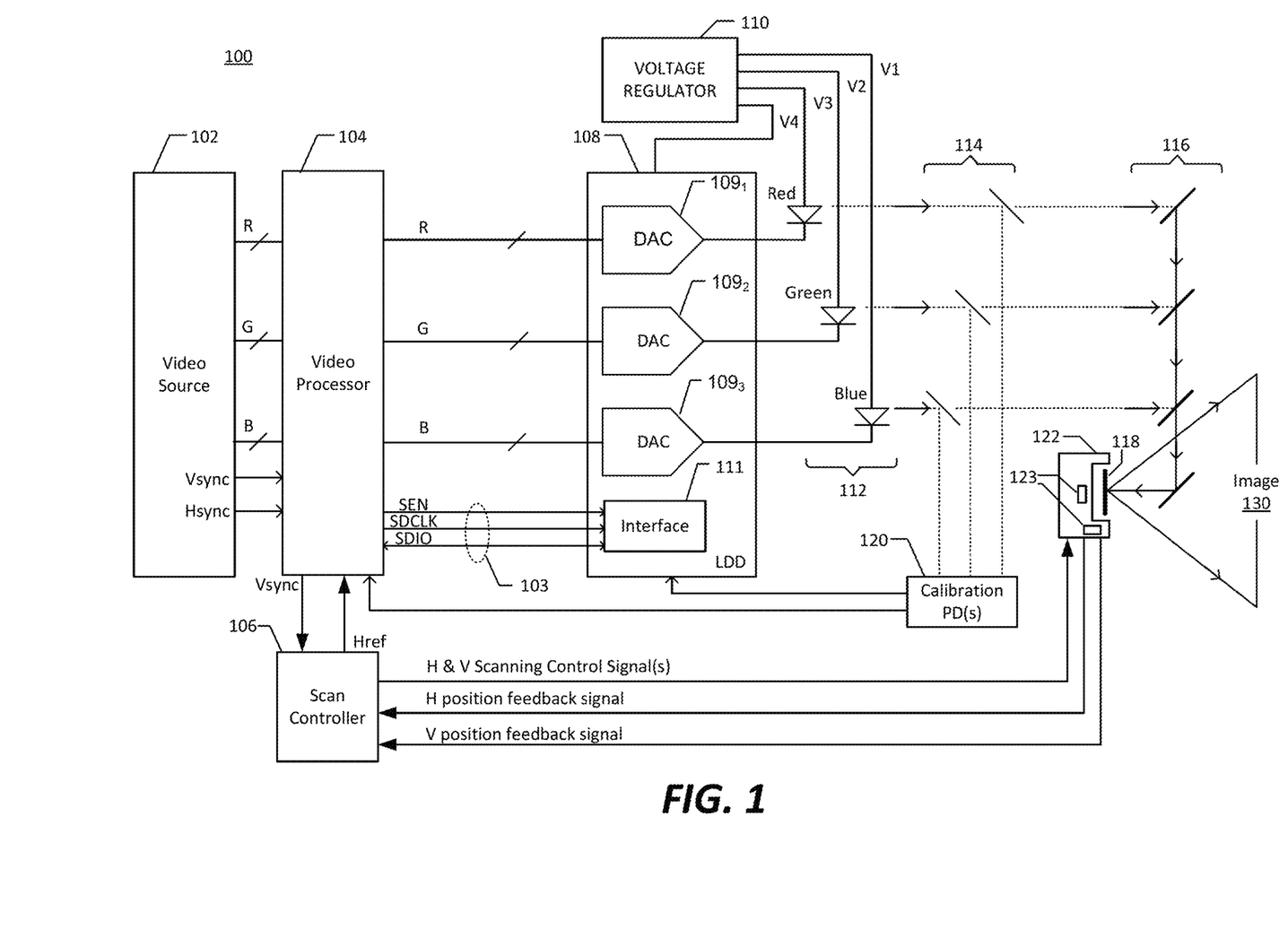
FIG. 1 illustrates an exemplary scanning projector display device, according to an embodiment.

FIG. 1 illustrates an exemplary miniature scanning projector display device 100, according to an embodiment. The miniature projector device 100 can be integrated with or attached to a portable device, such as, but not limited to, a mobile phone, a smart phone, a portable computer (e.g., a laptop, netbook or tablet), a personal data assistant (PDA), or a portable media player (e.g., DVD player). The miniature projector device 100 can alternatively be integrated with or attached to a non-portable device, such as a desktop computer, a media player (e.g., a DVD player), or an automotive heads up display, but is not limited thereto.

Referring to FIG. 1, the projector display device 100 is shown as including a video source 102, a video processor 104, a laser diode driver (LDD) 108 and a voltage regulator 110. Depending on the type of video source, a video analog-font-end (AFE) (not shown) can be included between the video source 102 and the video processor 104, and the video AFE may include, e.g., one or more analog-to-digital converters (ADCs). However, a video AFE may not be needed where the video source 102 is a digital video source. The video processor 104 receives red (R), green (G) and blue (B) pixel data, a horizontal synchronization (Hsync) signal and a vertical synchronization (Vsync) signal from the video source 102 (or a video AFE). The Hsync signal includes one pulse per horizontal line of a frame, which indicates the end of one line and the beginning of the next line. The Vsync signal includes one pulse per frame, which indicates the end of one frame and the beginning of the next frame.

The video processor 104 can be implemented, e.g., using an application specific integrated circuit (ASIC) and/or a micro-controller. The video processor 104 can perform scaling and/or pre-distortion of the R, G and B pixel data (also referred to simply as RGB pixel data) before such pixel data signals are provided to the LDD 108. Such scaling and/or pre-distortion can include interpolation and/or decimation. More generally, the video processor 104 can perform gamma correction, color space conversion, interpolation and/or decimation. The interpolation and/or decimation can be performed to map the input RGB pixel data (received from the video source 102, or an AFE) to the output RGB pixel data that is provided to the LDD 108, by taking into account the actual scanning trajectory and the actual position of the scanning mirror(s) 118. The processing of the RGB pixel data (including the interpolation and/or decimation) can differ based on whether an odd frame or an even frame is being processed.

The video processor 104 communicates with a scanning controller 106, which can also be referred to as scanning micro-mirror(s) controller 106, microelectromechanical systems (MEMS) controller, or a MEMS driver. The scanning controller 106 can produce a horizontal scanning control signal (H scanning control signal) and a vertical scanning control signal (V scanning control signal), which are used to control the scanning of one or more micro-mirror(s) 118, which can be MEMS mirror(s). Where a single bi-axial scanning mirror 118 is used, the H and V scanning control signals are combined into a combined H and V scanning control signal, which can also be referred to as a composite H and V scanning control signal. Where two uni-axial scanning mirrors 118 are used, the H and V scanning control signals are not combined. The combined H and V scanning control signal (or separate H and V scanning control signals) are provided to a MEMS scanning device 122 to control the scanning mirror(s) 118. Additional details of the scanning controller 106, according to specific embodiments, are discussed below. While shown as two separate blocks in FIG. 1, it is also within the scope of an embodiment to combine the video processor 104 and the scanning controller 106 into one functional block or circuit.

The voltage regulator 110 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the projector display device 100. The LDD 108 is shown as including three digital-to-analog converts DACs 1091, 1092 and 1093 (which can be collectively referred to as DACs 109). The LDD is also shown as including a serial interface 111 which may receive, via a serial bus 103, a serial enable (SEN) signal and a serial data clock signal (SDCLK) from a serial interface of the video processor 104. Additionally, a bi-directional serial data input/output (SDIO) line of the serial bus 103 allows the video processor 104 to write data to and read data from registers within the LDD 108. Alternative serial buses and interfaces can be used, such as, but not limited to, an Inter-Integrated Circuit (I2C) or a Serial Peripheral Interface (SPI) bus and interface. The LDD 108 also includes registers, and the like, which are not shown.

The DACs 109 of the LDD 108 drive laser diodes 112, which can include, e.g., a red, a green and a blue laser diode, but are not limited thereto. Where the LDD 108 is used to drive a red (R), a green (G) and a blue (B) laser diode, the LDD can be referred to as a RGB triple laser diode driver. The use of alternative light emitting elements, such as light emitting diodes (LEDs), etc., is also possible. Accordingly, as the term is used herein, a laser diode driver (LDD), unless stated otherwise, can drive light emitting elements including, but not limited to, laser diodes (e.g., the LDD may alternatively drive LEDs).

The light produced by the laser diodes 112 or other light emitting elements can be provided to beam splitters 114, which can direct a small percentage of the light toward one or more calibration photo-detectors (PDs) 120, and direct the remainder of the light toward projector optics 116, which include lenses, mirrors, reflection plates and/or the like. The light output by the optics 116 can be provided to one or more scanning micro mirror(s) 118 that are maneuvered by the scanning device 122. The scan controller 106 can control the scan device 122 to maneuver the mirror(s) 118 to raster-scan reflected light onto a surface, e.g., a screen, a wall, the back of a chair, etc, to thereby form an image 130. The mirror(s) 118 can be implemented, for example, using a single scanning mirror (which is often referred to as a bi-axial mirror) or using two uni-axial scanning mirrors. The scanning device 122 can include horizontal and vertical position sensors 123 (e.g., Piezo-resistive sensors) that provide one or more position feedback signal(s) indicative of the position of the mirror(s) 118 to the scanning controller 106, to provide real time position information to the scanning controller 106. It is also possible that the position sensors 123 are separate from the scanning device 122. The position sensors 123 can sense the angle of rotation of the mirror(s) 118 along the H and V scan directions. In certain embodiments, the scanning device 122 uses moving-coil actuation with a single drive coil (also referred to as an actuator coil) to maneuver a single bi-axial scanning mirror 118. Alternatively, the scanning device 122 can maneuver two uni-axial scanning mirrors using two drive coils. The scanning device 122 can also be referred to as a MEMS device, the scanning mirror(s) 118 can also be referred to as MEMS scanning mirror(s), and the MEMs device 122 and the scanning mirror(s) 118 can collectively be referred to as a MEMS scanning mirror assembly, or simply a MEMS scanner.

Figure 2:
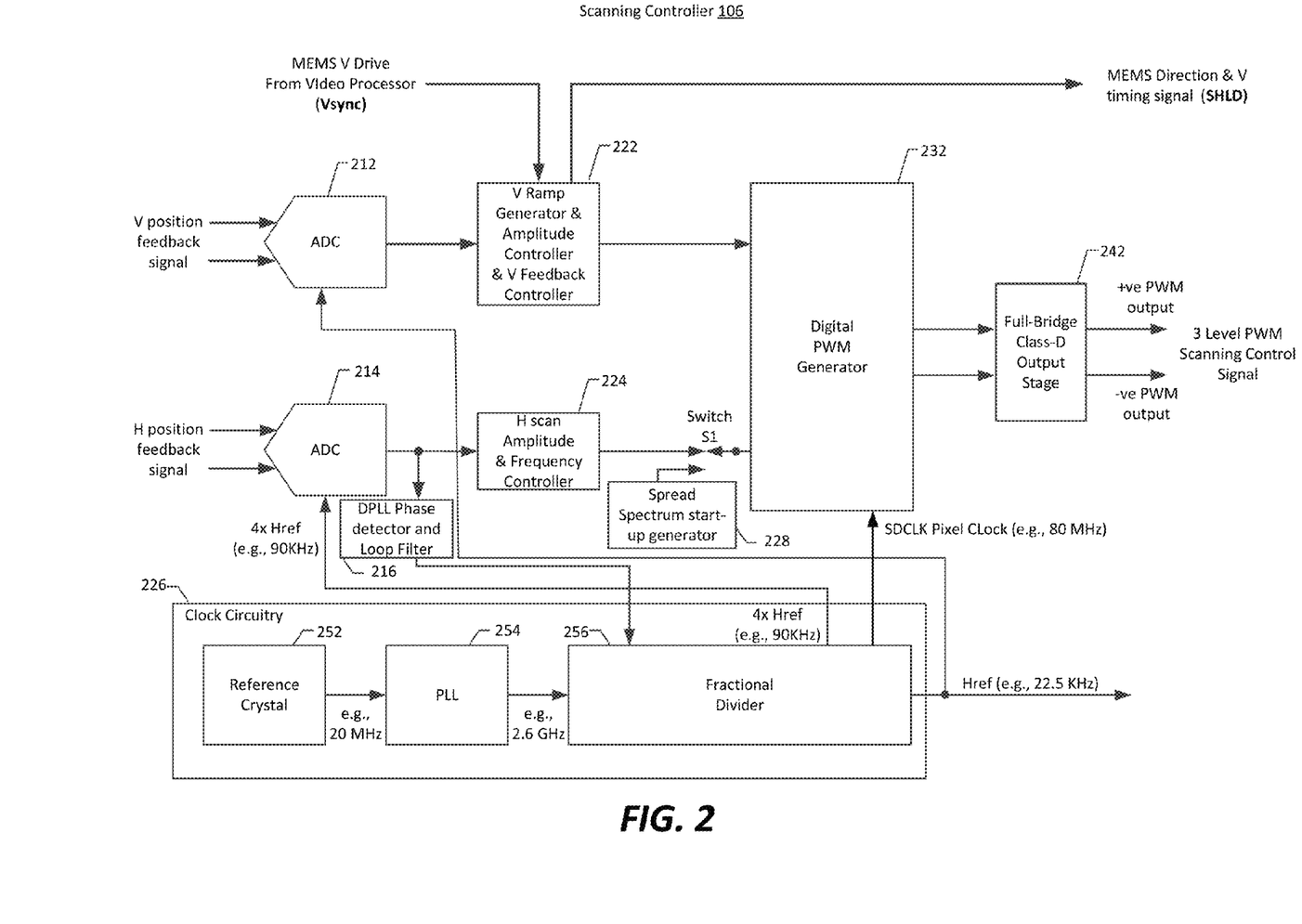
FIG. 2 is a block diagram that is used to illustrate details of a scanning controller, according to an embodiment.

FIG. 2 is a block diagram that is used to illustrate additional details of the scanning controller 106, according to an embodiment. Unless stated otherwise, it will be assumed that a single bi-axial scanning mirror 118 is used. Referring to FIG. 2, the scanning controller 106 is shown as including an analog-to-digital converter (ADC) 212 that receives a vertical position feedback signal indicative of a vertical position of the scanning mirror 118, and an ADC 214 that receives a horizontal position feedback signal indicative of a horizontal position of the scanning mirror 118. The feedback signals can be differential signals, in which case, the ADCs 212 and 214 have differential inputs. The feedback signals can be produced, e.g., using the horizontal (H) and vertical (V) position sensors 123, which can be part of the scanning device 122, or such sensors can be separate from the scanning device 122, as mentioned above.

The output of the ADC 212, which is a digitized version of the vertical position feedback signal, is provided to a vertical (V) ramp generator and amplitude controller 222. The output of the ADC 214, which is a digitized version of the horizontal position feedback signal, is provided to a horizontal (H) scan amplitude and frequency controller 224. The V ramp generator and amplitude controller 222 also receives the vertical sync (Vsync) signal from the video processor 104. In accordance with an embodiment, the V ramp generator and amplitude controller 222 and the H scan amplitude and frequency controller 224 are implemented using a processor, such as a digital signal processor (DSP). In embodiments where the scan controller 106 is implemented as part of the video processor 104, the same processor that is used to control the RGB video data path that provides data to the LDD 108 can also be used to implement the V ramp generator and amplitude controller 222 and the H scan amplitude and frequency controller 224. In embodiments where the scan controller 106 is implemented separately from the video processor 104, a separate microcontroller subsystem running DSP firmware can be used to implement the V ramp generator and amplitude controller 222 and the H scan amplitude and frequency controller 224. Such a microcontroller subsystem can include a processor core, memories, an interrupt controller, a clock system and boot logic, but is not limited thereto. It is also possible that a scan controller 106, including a V ramp generator and amplitude controller 222 and a H scan amplitude and frequency controller 224, is implemented using an application specific integrated circuit (ASIC) or other circuitry.

Digital outputs of the V ramp generator and amplitude controller 222 and the H scan amplitude and frequency controller 224 are provided to a digital pulse width modulated (PWM) signal generator 232, which can be a multi-channel (e.g., an 8-channel) PWM signal generator. The output of the V ramp generator and amplitude controller 222 is a digital sawtooth waveform signal that is used to define V drive pulses, which are discussed in more detail below with reference to FIGS. 3, 5A and 5B. The output of the H scan amplitude and frequency controller 224 is a digital control signal that is used to define H drive pulses, which are discussed in more detail below with reference to FIGS. 3, 5A and 5B. The output of the V ramp generator and amplitude controller 222 is adjusted in dependence on the output of the ADC 212. Similarly, the output of the H scan amplitude and frequency controller 224 is adjusted in dependence on the output of the ADC 214.

Where a single bi-axial scanning mirror 118 is being driven, the PWM signal generator 232 generates and outputs a combined PWM horizontal and vertical (H and V) scanning control signal that is used to control the scanning of the single bi-axial mirror. In accordance with an embodiment, the combined PWM H and V scanning control signal includes +ve PWM and −ve PWM signals. A three-level PWM scanning control signal, which is equal to the difference in voltage between the +ve PWM signal and the −ve PWM signal, controls the bi-axial scanning mirror. In FIG. 2, the combined PWM H and V scanning control signal is shown as being provided to a full-bridge class-D output stage 242, the outputs of which are amplified versions of the +ve PWM and −ve PWM signals that drive the scanning device 122 (and more specifically, the actuator coil thereof). More specifically, the full-bridge class-D output stage 242 amplifies the +ve PWM and −ve PWM signals to appropriate levels for driving an actuator coil that applies electromagnetic forces to move the bi-axial scanning mirror. Alternatively, where two uni-axial scanning mirrors 118 are being driven, the multi-channel PWM signal generator 232 can generate separate PWM H and V scanning control signals which are separately amplified and separately used to control the two scanning mirrors. In FIG. 2, the output stage 242 is shown as being part of the scanning controller 106, but the output stage 242 can alternatively be external to the scanning controller 106.

The scanning controller 106 is also shown as including clock circuitry 226, which can include a reference crystal 252, a phased locked loop (PLL) 254 and a fractional divider 256. The PLL 254 can be used to generate a high frequency clock signal (e.g., 2.6 GHz) from a lower frequency reference signal (e.g., 20 to 40 MHz) received from the reference crystal 252. The fractional divider 256 can be used to generate various clock signals having different frequencies, e.g., 22.5 KHz, 90 KHz, 80 MHz, etc., which are used by the various blocks of the scanning controller 106, and potentially by blocks that are outside of the scanning controller 106. In specific embodiments, the fractional divider 256 generates a horizontal scanning frequency reference signal (Href) which is provided to the ADC 212 and the video processor 104. The frequency of the Href signal can be a frequency within the range of 18-30 KHz (e.g., 22.5 KHz), but is not limited thereto. Additionally, a clock signal having a frequency that is multiple times (e.g., four times) the Href frequency is provided to the ADC 214 to enable the ADC 214 to sample at twice the Nyquist frequency. The fractional divider 256 can also produce a SDCLK pixel clock signal (e.g., 80 MHz) that is provided to the digital PWM generator 232. This SDCLK signal may also be used as the sampling clock for the LDD data. In accordance with an embodiment, the PLL 254 is implemented using analog circuitry and the fractional divider 256 is implemented using digital circuitry.

The scanning controller 106 is also shown as including a digital PLL (DPLL) phase detector and loop filter 216 that varies the frequency of the signals output by the fractional divider 256 so that they are multiples of the H resonance frequency of the scanning mirror 118, as sensed using the H position sensor 123 (which is part or, or separate from, the scanning device 122) and the ADC 214. The output of the DPLL phase detector and loop filter 216 is a digital value (e.g., a 32 bit value), a portion of which corresponds to an integer divisor, and a portion of which corresponds to a fractional devisor, as can be appreciated from FIG. 5A, which is discussed below.

The H scan amplitude and frequency controller 224 controls the H scanning amplitude and the H scanning frequency. With respect the H scanning amplitude, H scan amplitude and frequency controller 224 varies the H scanning control signal amplitude to maintain a constant scan amplitude, as sensed by the MEMS H position sensor (e.g., 123). There are three horizontal (H) frequencies of interest, which are nominally similar, but subtly different, including the H resonance frequency, the H drive frequency and the H scanning frequency. The H resonance frequency is the natural oscillation frequency of the bi-axial single scanning mirror in the H scanning direction, which frequency varies with oscillation amplitude and device temperature. The H drive frequency is the frequency of the alternating H pulses produced by the PWM generator. The H scanning frequency, which is the actual oscillation frequency of the mirror in the H scanning direction, follows the H drive frequency, but with a time lag. The phase of the sinusoidal scanning motion will also deviate from the phase of the H drive signal depending on the difference in frequency between the H resonance frequency and the H drive frequency. A feedback loop operates to seek an equilibrium point that causes the H drive frequency and the H scanning frequency to converge toward and preferably equal the H resonance frequency. Stated another way, a feedback loop operates to make the H drive frequency equal to the H resonance frequency, and to reduce to zero a phase difference between the H drive frequency and the H scanning frequency. This feedback loop includes the ADC 214, the DPLL phase detector and loop filter 216, the fractional divider 256 and the Digital PWM generator 242.

One of the tasks of the scanning controller 106 is to discover the H resonance frequency of the scanning mirror 118. While this can be accomplished using analog feedback around the scanning device 122 (also referred to as the MEMS device) to produce a self-oscillation at the resonance frequency, this technique is unsuitable for a DSP based system. Alternatively, a swept or stepped frequency 'probe' signal can be used to search for the H resonance frequency. However, because of the narrow bandwidth of the MEMS resonance (the resonance bandwidth can be less than 10 Hz, and the frequency span to be searched cover 10% or more of the resonance frequency, for example 2.25 KHz), this technique would be slow. In accordance with specific embodiments, a parallel frequency search technique is used to substantially simultaneously excite the entire search bandwidth. More specifically, a spread spectrum signal generator 228 is used to generate a spread spectrum signal during start-up of the display device 100. The spread spectrum signal generator 228 can include, for example, a pseudorandom bit sequence (PRBS) generator that drivers a binary phase-shift keying (BPSK) modulator to generate a full amplitude spread spectrum signal with energy across the entire search bandwidth. The PRBS can be implemented, e.g., using a linear feedback shift register (LFSR), but is not limited thereto. Beneficially, a full power spread spectrum signal cannot damage the scanning device 122 because only a fraction of its energy will be in the mechanical bandwidth. The motion of the scanning mirror 118 in the H direction will be bandpass filtered noise—a sinusoidal motion with highly variable amplitude and phase. An amplitude of the output of the H scan position sensor 123 is monitored (e.g., using an amplitude detector), and when it exceeds a predetermined threshold amplitude (e.g., using a threshold detector), the H resonance frequency is discovered, at which point the spread spectrum scanning control signal is switched off, e.g., using the switch S1 shown in FIG. 2. Thereafter, the H motion of the scanning mirror 118 is controlled in dependence on the output of the H scan amplitude and frequency controller 224. The predetermined threshold amplitude can be in the range of ⅒th to ½ the desired amplitude. This technique is also immune to variations in H resonance frequency with mirror angular swing, which may cause trouble during a swept frequency search. The aforementioned amplitude detector and threshold detector can be implemented as part of the spread spectrum signal generator 228, or can be implemented as separate functional blocks.

The combined H and V scanning control signal (which can also be referred to simply as the H and V scanning control signal) includes H scanning frequency content that is used to control a H scanning frequency of the bi-axial scanning mirror 218, and V scanning frequency content that is used to control a V scanning frequency of the bi-axial scanning mirror 218. The H scanning frequency content has a much higher frequency than the relatively slower V scanning frequency content. For example, the H scanning frequency content can have a frequency of about 22.5 KHz, whereas the V scanning frequency content can have a frequency of about 60 Hz. Crosstalk between the H and V scanning frequencies can adversely affect the horizontal and vertical scanning control of the scanning mirror(s) 118 and thereby adversely affect the resulting image 130. Certain embodiments disclosed herein relate to ways of reducing and preferably avoiding such crosstalk. Preferably, these embodiments avoid such crosstalk without requiring high DSP sample rates.

Figure 3A:
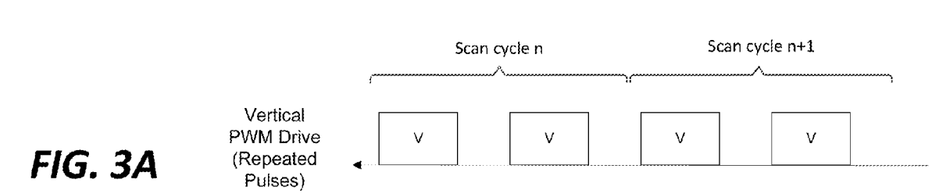
FIGS. 3A, 3B, and 3C, which can collectively be referred to as FIG. 3, illustrate how pulse width modulated (PWM) vertical (V) and horizontal (H) scanning control signals are conceptually combined in the time domain to provide a three-level PWM scanning control signal, according to an embodiment.
Figure 3B:
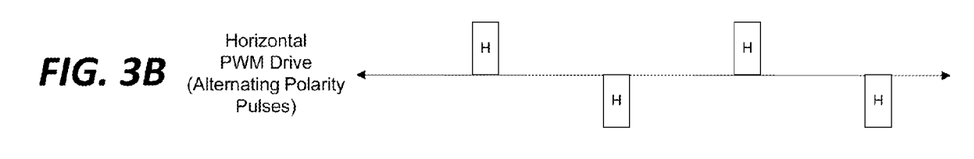
Figure 3C:
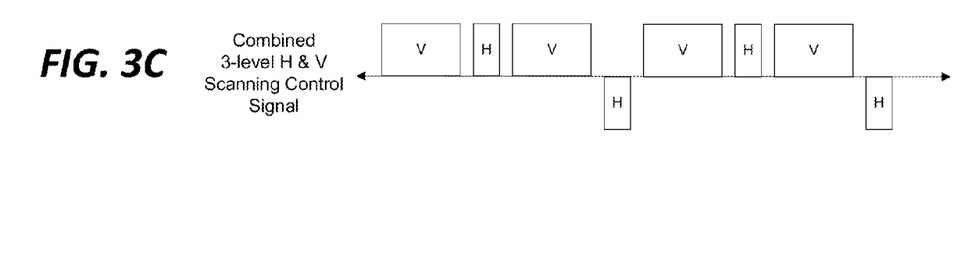
Figure 4:
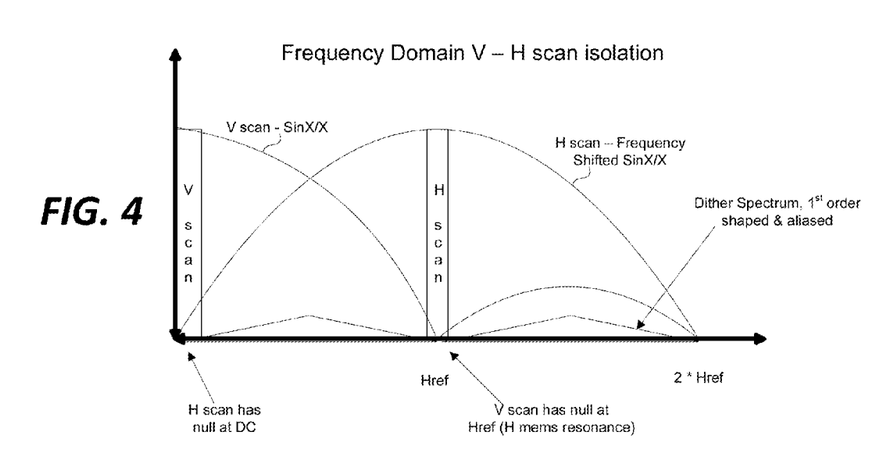
FIG. 4 illustrates how crosstalk is avoided in the frequency domain, in accordance with an embodiment.

FIGS. 3 and 4, which will be described in additional detail below, are used to illustrate how specific embodiments exploit the bandpass nature of the H scanning control signal, and the high Q bandpass response of the scanning mirror 118. At a high level, the scanning controller 106 processes the H scan amplitude and phase in the complex low pass time domain, and generates the final H scanning frequency in the PWM generator 232 itself. This is done by inverting the polarity of alternate H drive pulses of the H and V scanning control signal, creating a 'carrier' at the PWM repetition rate. This alternating polarity waveform has a natural null at DC, and its higher harmonics are attenuated by the MEMS mechanical transfer function. The V scanning frequency content of the H and V scanning control signal is filtered by a boxcar filter of a length equal to one Href cycle. This produces a null at the H resonance frequency associated with the scanning mirror 118, thereby separating the H scanning frequency content and V scanning frequency content in the frequency domain.

FIGS. 3A, 3B, and 3C, which can collectively be referred to as FIG. 3, illustrate conceptually how PWM V and H scanning control signals are combined in the time domain to provide a three-level PWM scanning control signal. More specifically, FIG. 3A illustrates an exemplary conceptual PWM V scanning control signal for two scan cycles, FIG. 3B illustrates an exemplary conceptual PWM H scanning control signal for the same two scan cycles, and FIG. 3C illustrates a conceptual combined (also referred to as a composite) H and V scanning control signal for the two scan cycles. In accordance with certain embodiments, crosstalk is avoided by positioning the PWM H control pulses (which can also be referred to as H drive pulses) in the gaps between consecutive PWM V pulses (which can also be referred to as V drive pulses) in the time domain. This can also be considered positioning the PWM V pulses in the gaps between consecutive PWM H pulses in the time domain. When the V scanning control signal of FIG. 3A and the H scanning control signal of FIG. 3B are combined to produce the composite H and V scanning control signal of FIG. 3C, the resulting composite H and V scanning control signal actually consists of two waveforms, as can be appreciated from FIG. 5B described below. If a single PWM H pulse and a single PWM V pulse were instead combined into a simpler signal with two total PWM pulses per scan cycle, then non-linear crosstalk from the PWM V pulse would be introduced into the PWM H pulse. This is why, in accordance with specific embodiments, each cycle of the composite H and V scanning control signal is formed from four PWM pulses with eight separate edges.

FIG. 4 illustrates how crosstalk is avoided in the frequency domain. As mentioned above, the nulls in the H drive signal are achieved at DC and at harmonics of the H scan frequency (i.e., harmonics of Href) by inverting the polarity of alternate PWM H drive pulses. Stated another way, the H drive pulses are generated such that they have alternating positive and negative polarities, as can be appreciated from FIGS. 3B and 3C. FIG. 4 shows the nulls at DC and at two times Href. As also mentioned above, a boxcar filter of a length equal to one Href cycle is used to produce a null in the V drive signal at the horizontal resonance associated with the scanning mirror 118, thereby separating the H and V scanning control signals in the frequency domain, as can be appreciated from FIG. 4.

Figure 5A:
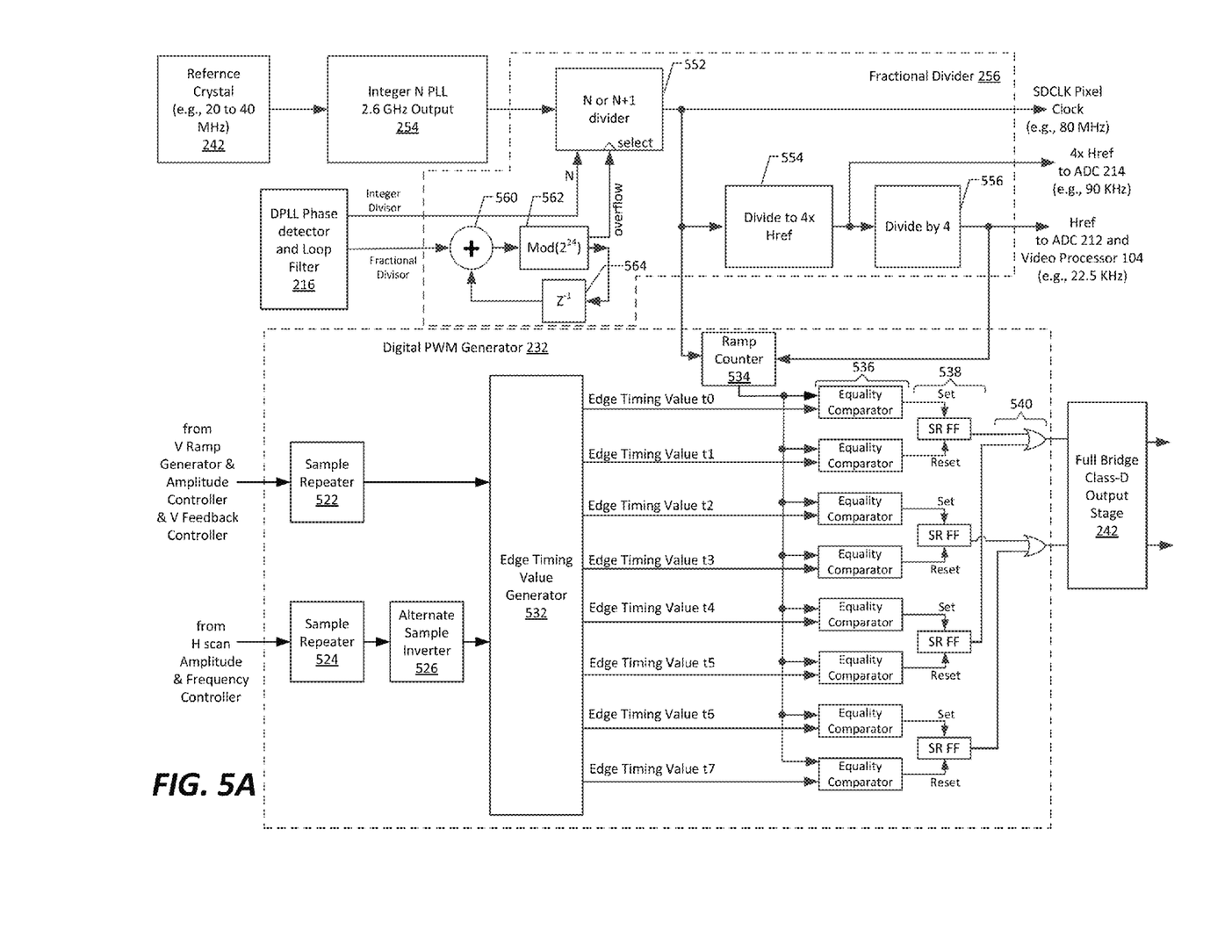
FIG. 5A illustrates additional details of the digital PWM generator and fractional divider of the scanning controller of FIG. 2, according to an embodiment.
Figure 5B:
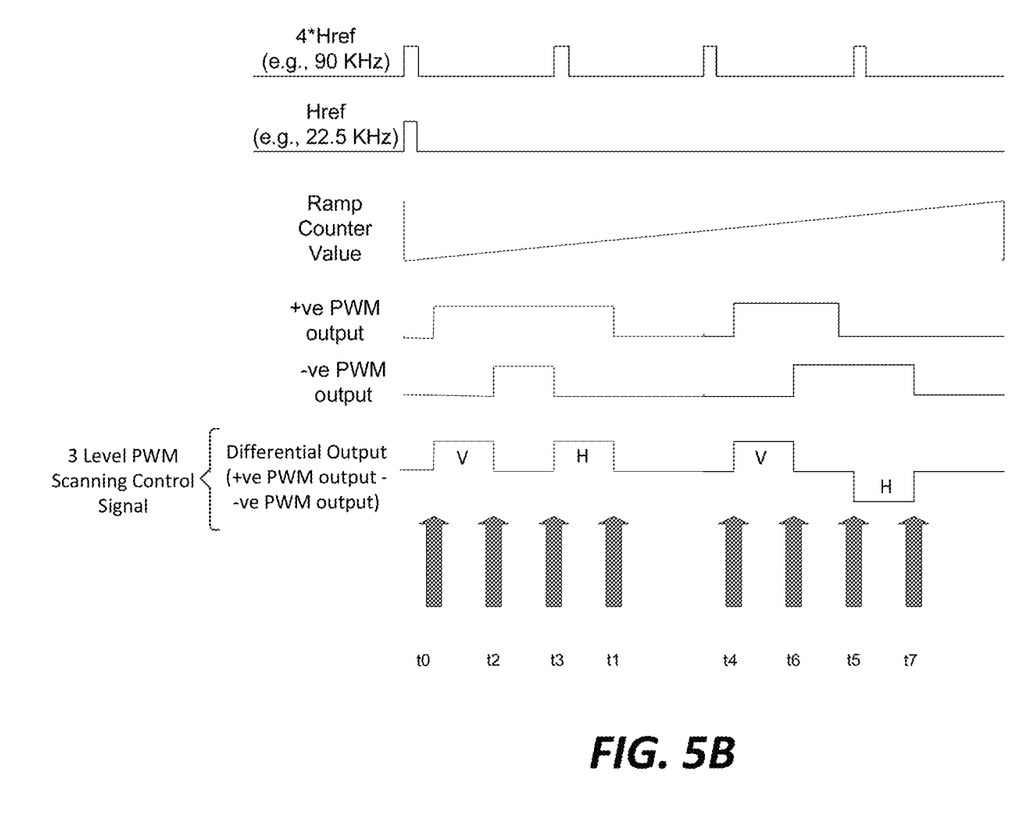
FIG. 5B is an exemplary timing diagram that corresponds to FIG. 5A.

FIG. 5A illustrates additional details of the digital PWM generator 232 and the fractional divider 256, according to an embodiment. FIG. 5B is an exemplary timing diagram that corresponds to FIG. 5A. Referring to FIG. 5A, in accordance with an embodiment, the digital PWM generator 232 includes sample repeaters 522 and 524, an alternate sample inverter 526, an edge timing value generator 532, a ramp counter 534 and eight digital equality comparators 536. The sample repeater 522 receives digital samples output by the V ramp generator and amplitude controller 222 (which samples correspond to a digital sawtooth waveform signal that is used to define V drive pulses), and repeats each sample, effectively doubling the sample rate. Similarly, the sample repeater 524 receive digital samples output by the H scan amplitude and frequency controller 224 (which samples correspond to a digital pulse width signal that is used to define H drive pulses), and repeats each sample, effectively doubling the sample rate. The digital samples output by the sample repeater 522 are provided to the edge timing value generator 532. The digital samples output by the sample repeater 524 are provided to the alternate sample inverter 526, which inverts the polarity of every other sample, before such samples are provided to the edge timing value generator. The sample repeater 522 is an implementation of a boxcar filter, which as mentioned above, essentially filters the V scanning frequency content of the H and V scanning control signal to produce a null at the H resonance frequency associated with the scanning mirror 118, thereby separating the H scanning frequency content and V scanning frequency content in the frequency domain. The alternate sample inverter 526 is used to invert the polarity of alternate PWM H pulses, which as mentioned above, results in nulls at DC and at harmonics of the H scan frequency (i.e., harmonics of Href).

The edge timing value generator 532 performs two functions. First it takes digital sample values and encodes them into corresponding edge time values. This takes the stream of sample values from sample repeater 522 and turns it into the edge times for the waveform in FIG. 3A. Likewise the sample values from the alternate sample inverter 526 become the edge times in FIG. 3B. Secondly, the edge timing value generator 532 combines the edge times from FIG. 3A and FIG. 3B to generate the full set of edge times for the waveform in FIG. 3C. This process follows of the construction rules for 3 level PWM waveforms, so that only one of the outputs of the full-bridge class-D output stage changes state during any one clock cycle.

The ramp counter 534 is incremented by a clock signal (labeled SDCLK pixel clock) output by the fractional divider 256, and is reset in dependence on the Href signal (e.g., on the rising edge of the Href signal), thereby causing it to be reset at the beginning of each horizontal scan cycle. The ramp counter 534 counts up, e.g., from 0 to 3583, every horizontal scan cycle, and the ramp count value of the ramp counter 534 is provided to each of the eight digital equality comparators 536.

Each of the digital equality comparators 536, in addition to receiving the ramp count value of the ramp counter 534, also receives a different edge timing value t0, t1, t2 ... t7 from the edge timing generator 532. Each digital equality comparator 536 compares the ramp count value it receives to the edge timing value it receives and outputs a pulse when the two values are equal. Four of the digital equality comparators 536 provide their output to the set terminal of one of four set-reset flip-flops (SR FFs) 538, and the other four digital equality comparators 536 provide their outputs to a reset terminal of one of the four SR FFs 538. The outputs of two of the SR FFs 538 are provided to an OR gate 540, and the outputs of the remaining two SR FFs 538 are provided to another OR gate 540. In this manner, the two OR gates 540 are used to produce the waveforms labeled "+ve PWM output" and "−ve PWM output". The two waveforms are provided to a full-bridge class-D output stage 242, which amplifies the signals to an appropriate level for driving an actuator coil of the scanning device 122. The outputs of the full-bridge class-D output stage 242 can be used to directly drive the actuator coil of the scanning device 122, or can first be filtered.

If two separate uniaxial mirrors are used for the H and V scanning, then instead of combining the H and V scanning control signals into a single composite scanning control signal, they are routed to separate full-bridge class-D output stages 242, one for the H scanning mirror and one for the V scanning mirror. For such embodiments, the edge timing value generator 532 in FIG. 5A would provide different appropriate edge timing values t0-t7 to the digital equality comparators 536.

Still referring to FIG. 5A, the fractional divider 256 is shown as including an N or N+1 divider 552, which divides the 2.6 GHz output of the Integer N PLL 254 by a value of either an integer N or N+1, in dependence on an integer divisor output of the DPLL phase detector and loop filter 216 and an overflow output of a modulo ($2^{24}$) block 562. The output of the N or N+1 divider 552, which is labeled the SDCLK pixel clock, is divided to 4 times Href by block 554, and divided to Href by block 556. The fractional divider 256 is also shown as including an adder 560 and a filter 564 which receives an output of the a modulo ($2^{24}$) block 562.

Referring now to FIG. 5B, the two uppermost waveforms are exemplary 4×Href and Href signals output by the fractional divider 256 of the scanning controller 106. As mentioned above, the 4×Href signal is provided to the ADC 214 to enable the ADC 214 to sample at the Nyquist frequency. The Href signal is provided to the ADC 212 and the video processor 104. The next waveform is the ramp counter value, generated by the ramp counter 534, which ramps up from a minimum to maximum value during one period of the Href signal, and is thereafter reset by the next Href pulse. The next two waveforms, labeled +ve PWM output and −ve PWM output, are examples of two waveforms used to generate a three-level PWM scanning control signal (either before or after they are amplified by the full-bridge class-D output stage 242). The lowermost waveform, which is a three-level PWM scanning control signal, illustrates the differential voltage that drives the actuator coil of the scanning device 122. This lowermost waveform, which is equal to the +ve PWM output signal minus the −ve PWM output signal, includes eight edges that define two PWM V drive pulse and two PWM H drive pulses, with each PWM H drive pulse positioned between consecutive PWM V drive pulses, and with the H driver pulses alternating between a positive polarity and a negative polarity. In accordance with specific embodiments, the eight edges are defined by the edge timing values t0-t7 generated by the edge timing value generator 532 shown in FIG. 5A.

Figure 6:
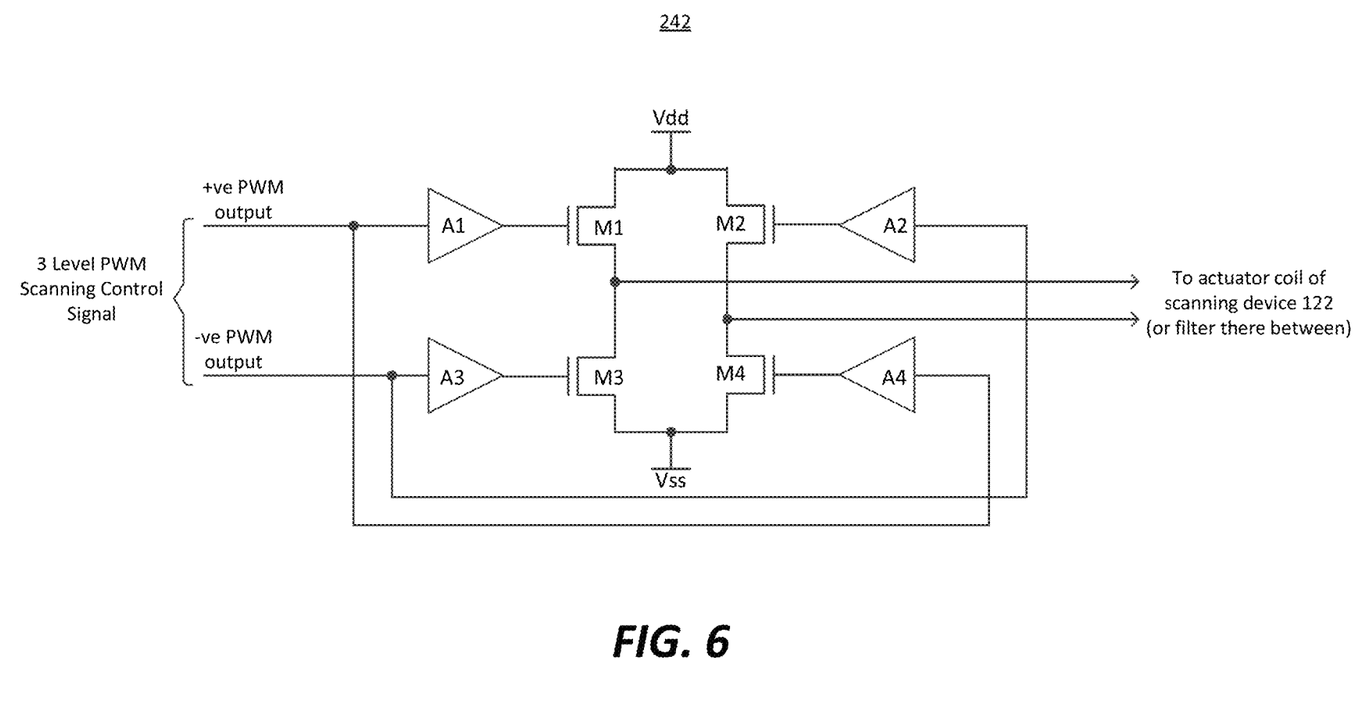
FIG. 6 shows an exemplary implementation of the full-bridge class-D output stage introduced in FIG. 2.

FIG. 6 shows an exemplary implementation of the full-bridge class-D output stage 242, which is shown as including four power amplifiers A1-A4, and four MOSFET transistors M1-M4. However, it is noted that one of ordinary skill in the art would appreciate that other equivalent circuitry can be used to implement the full-bridge class-D output stage 242.

Figure 7:
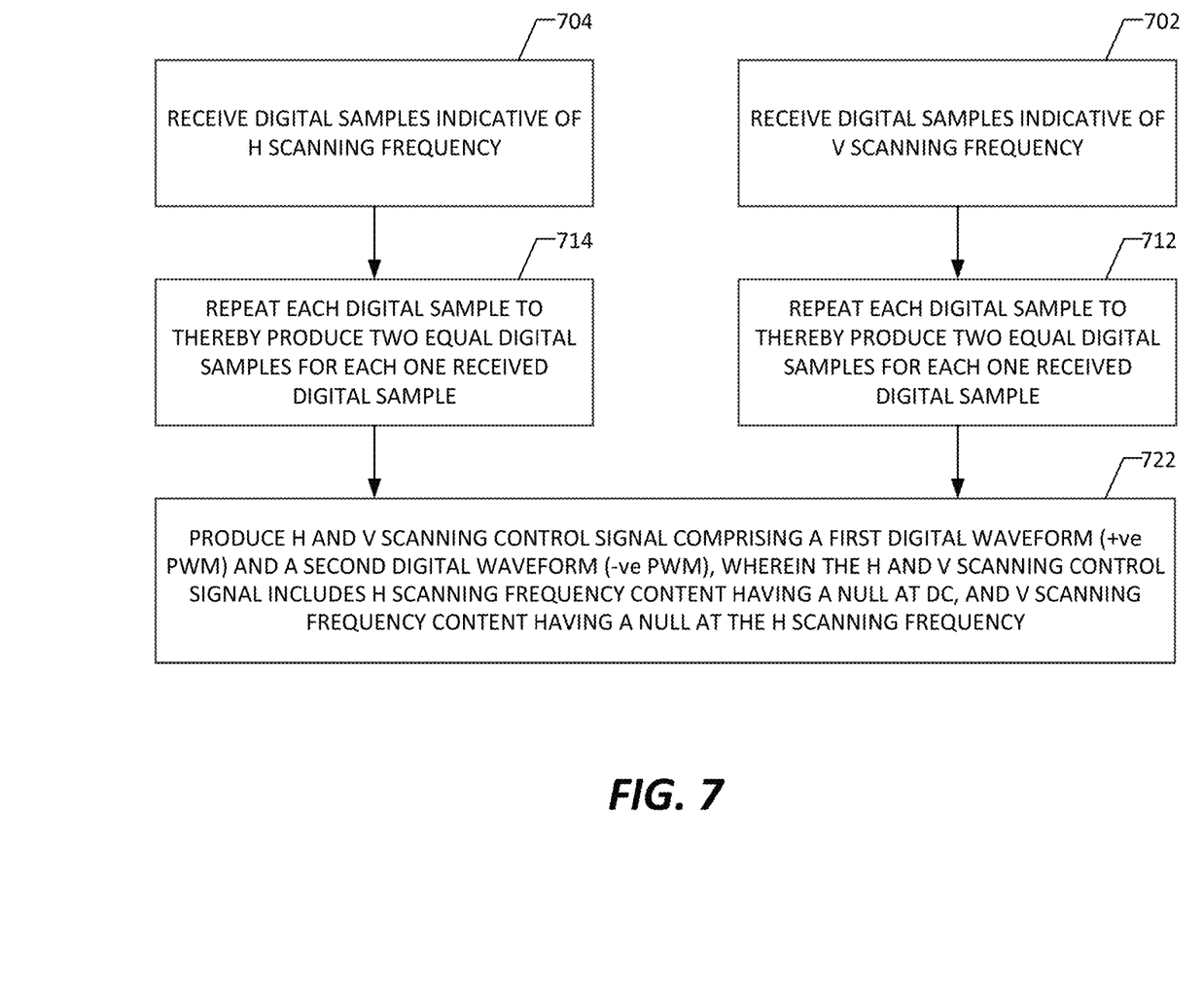
FIG. 7 is a high level flow diagram that is used to summarize a method according to an embodiment.

The high level diagram of FIG. 7 will now be used to summarize a method for providing a signal that can be used to control a bi-axial scanning mirror, in accordance with an embodiment of the present invention. Referring to FIG. 7, at step 702, digital samples indicative of a V scanning frequency are received, and at step 712, each of the digital samples received at step 702 is repeated to thereby produce two equal digital samples for each one received digital sample. Similarly, at step 704, digital samples indicative of a H scanning frequency are received, and at step 714, each of the digital samples received at step 704 is repeated to thereby produce two equal digital samples for each one received digital sample. Referring back to FIGS. 2 and 5A, the samples received at step 702 and 704, respectively, can be received from the V ramp generator and amplitude controller 222 and the H scan amplitude and frequency controller 224. At step 722, a H and V scanning control signal is produced, which comprises a first digital waveform (+ve PWM) and a second digital waveform (−ve PWM), wherein the H and V scanning control signal includes H scanning frequency content that has a null at DC, and V scanning frequency content that has a null at the H scanning frequency. Referring back to FIGS. 2 and 5A, the aforementioned steps can be performed by the digital PWM generator 232. Additional details of the above described steps can be appreciated from the above detailed description of FIGS. 1-6.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:
1. An apparatus, comprising:
a scanning controller configured produce a horizontal (H) and vertical (V) scanning control signal that is used to control a bi-axial scanning mirror of a scanning laser projector device;
wherein the H and V scanning control signal includes H scanning frequency content that is used to control a H scanning frequency of the bi-axial scanning mirror, and V scanning frequency content that is used to control a V scanning frequency of the bi-axial scanning mirror; and wherein the scanning controller is configured to produce the H and V scanning control signal such that the H scanning frequency content has a null at DC, and the V scanning frequency content has a null at the H scanning frequency.

2. The apparatus of claim 1, wherein the H and V scanning control signal comprises a first digital waveform (+ve PWM) and a second digital waveform (−ve PWM).

3. The apparatus of claim 2, wherein:
a three-level pulse width modulated (PWM) signal, which is equal to the first digital waveform (+ve PWM) minus the second digital waveform (−ve PWM), comprises four drive pulses per scanning cycle, which include two V drive pulses and two H drive pulses;
the two V drive pulses within each scanning cycle are spaced apart from one another in the time domain, have a same pulse width, and have a same polarity; and
the two H drive pulses within each scanning cycle are spaced apart from one another and do not overlap the two V drive pulses in the time domain, have a same pulse width and have opposite polarities.

4. The apparatus of claim 3, wherein:
one of the two H drive pulses within each scanning cycle is located in a gap between the two V drive pulses of the scanning cycle in the time domain; and
the other one of the two H drive pulses within the scanning cycle is located between one of the two V drive pulses of the scanning cycle and a V drive pulse of an adjacent scanning cycle in the time domain.

5. The apparatus of claim 3, wherein the four drive pulses per scanning cycle are interleaved in the time domain such that they do not overlap one another in the time domain.

6. The apparatus of claim 2, wherein the scanning controller comprises:
a digital PWM generator configured to produce the first digital waveform (+ve PWM) and the second digital waveform (−ve PWM).

7. The apparatus of claim 6, wherein the scanning controller further comprises:
a full-bridge class-D output stage that is configured to amplify the first digital waveform (+ve PWM) and the second digital waveform (−ve PWM) before the first digital waveform (+ve PWM) and the second digital waveform (−ve PWM) are used to drive an actuator coil that maneuvers the bi-axial scanning mirror of the scanning laser projector device.

8. The apparatus of claim 6, wherein the digital PWM generator comprises:
a ramp counter configured to increment a count value in dependence on a clock signal and reset the count value at a beginning or an end of each scanning cycle;
an edge timing value generator configured to produce a plurality of edge timing values;
a plurality of digital equality comparators each of which is configured to compare a current count value of the ramp counter to a different one of the edge timing values and output a pulse when the compared values are equal; and
circuitry configured to generate the first digital waveform (+ve PWM) and the second digital waveform (−ve PWM) in dependence on the pulses output by the plurality of digital equality comparators.

9. The apparatus of claim 8, wherein the circuitry configured to generate the first digital waveform (+ve PWM) and the second digital waveform (−ve PWM), in dependence on pulses output by the plurality of digital equality comparators, includes set-reset (SR) flip-flops and OR gates.

10. The apparatus of claim 1, wherein:
the H and V scanning control signal comprises a first digital waveform (+ve PWM) and a second digital waveform (−ve PWM);
a three-level pulse width modulated (PWM) signal, which is equal to the first digital waveform (+ve PWM) minus the second digital waveform (−ve PWM), comprises two V drive pulses and two H drive pulses that are interleaved in the time domain such that they do not overlap one another in the time domain; and
the two H drive pulses within each scanning cycle have opposite polarities.

11. A method for providing a signal that can be used to control a bi-axial scanning mirror, comprising:
producing a horizontal (H) and vertical (V) scanning control signal that includes H scanning frequency content used to control a H scanning frequency of a bi-axial scanning mirror, and V scanning frequency content used to control a V scanning frequency of the bi-axial scanning mirror; and
wherein the producing the H and V scanning control signal is performed such that the H scanning frequency content has a null at DC, and the V scanning frequency content has a null at the H scanning frequency.

12. The method of claim 11, wherein the producing step includes:
(a) receiving digital samples indicative of a H scanning frequency and repeating each of the digital samples to thereby produce two equal digital samples for each one received digital sample;
(b) receiving digital samples indicative of a V scanning frequency and repeating each of the digital samples to thereby produce two equal digital samples for each one received digital sample; and
(c) producing, in dependence on the results of steps (a) and (b), a first digital waveform (+ve PWM) and a second digital waveform (−ve PWM) that comprise the H and V scanning control signal.

13. The method of claim 12, wherein:
a three-level pulse width modulated (PWM) signal, which is equal to the first digital waveform (+ve PWM) minus the second digital waveform (—ve PWM), comprises four drive pulses per scanning cycle, which includes two V drive pulses and two H drive pulses;
the two V drive pulses within each scanning cycle are spaced apart from one another in the time domain, have a same pulse width, and have a same polarity; and
the two H drive pulses within each scanning cycle are spaced apart from one another and do not overlap the two V drive pulses in the time domain, have a same pulse width and have opposite polarities.

14. The method of claim 13, wherein:
one of the two H drive pulses within each scanning cycle is located in a gap between the two V drive pulses of the scanning cycle in the time domain; and
the other one of the two H drive pulses within the scanning cycle is located between one of the two V drive pulses of the scanning cycle and a V drive pulse of an adjacent scanning cycle in the time domain.

15. The method of claim 13, wherein the four drive pulses per scanning cycle are interleaved in the time domain such that they do not overlap one another in the time domain.

16. A scanning laser projector system, comprising:
a video processor configured to receive RGB pixel data, process the received RGB pixel data, and output processed RGB pixel data, wherein the video processor processes the received RBG data by performing at least one of gamma correction, color space conversion, interpolation or decimation;
red (R), green (G) and blue (B) light emitting elements;
a light emitting element driver configured to receive the processed RGB pixel data from the video processor and output drive signals configured to drive the R, G and B light emitting elements, thereby causing the R, G and B light emitting elements to emit light;
projector optics configured receive at least a portion of the light emitted by the R, G and B light emitting elements;
a bi-axial scanning mirror configured to reflect light directed toward the bi-axial scanning mirror by the projector optics;
a scanning controller configured produce a horizontal (H) and vertical (V) scanning control signal that is used to control the bi-axial scanning mirror;
wherein the H and V scanning control signal includes H scanning frequency content that is used to control a H scanning frequency of the bi-axial scanning mirror, and V scanning frequency content that is used to control a V scanning frequency of the bi-axial scanning mirror; and
wherein the scanning controller is configured to produce the H and V scanning control signal such that the H scanning frequency content has a null at DC, and the V scanning frequency content has a null at the H scanning frequency.

17. The system of claim 16, wherein the H and V scanning control signal comprises a first digital waveform (+ve PWM) and a second digital waveform (−ve PWM).

18. The system of claim 17, wherein:
a three-level pulse width modulated (PWM) signal, which is equal to the first digital waveform (+ve PWM) minus the second digital waveform (−ve PWM), comprises four drive pulses per scanning cycle, which include two V drive pulses and two H drive pulses;
the two V drive pulses within each scanning cycle are spaced apart from one another in the time domain, have a same pulse width, and have a same polarity; and
the two H drive pulses within each scanning cycle are spaced apart from one another and do not overlap the two V drive pulses in the time domain, have a same pulse width and have opposite polarities.

19. The system of claim 18, wherein:
one of the two H drive pulses within each scanning cycle is located in a gap between the two V drive pulses of the scanning cycle in the time domain; and
the other one of the two H drive pulses within the scanning cycle is located between one of the two V drive pulses of the scanning cycle and a V drive pulse of an adjacent scanning cycle in the time domain.

20. The system of claim 18, wherein the four drive pulses per scanning cycle are interleaved in the time domain such that they do not overlap one another in the time domain.

* * * * *

UNITED STATES PATENT AND TRADEMARK OFFICE
CERTIFICATE OF CORRECTION

PATENT NO. : 8,902,346 B2  Page 1 of 1
APPLICATION NO. : 13/763455
DATED : December 2, 2014
INVENTOR(S) : Luff It is certified that error appears in the above-identified patent and that said Letters Patent is hereby corrected as shown below:

In the claims

Column 10, line 58, claim 1: After "configured" and before "produce", please insert -- to --

Column 13, line 15, claim 16: After "configured" and before "produce", please insert -- to --

Signed and Sealed this
Fifth Day of April, 2016

Michelle K. Lee
*Director of the United States Patent and Trademark Office*